(12) United States Patent
Joy (10) Patent No.: US 10,108,997 B2
(45) Date of Patent: Oct. 23, 2018

(54) CONSUMER PROGRESS MONITORING

(71) Applicant: NCR Corporation, Duluth, GA (US)

(72) Inventor: Ian M. Joy, Scotland (GB)

(73) Assignee: NCR Corporation, Atlanta, GA (US)

( * ) Notice: Subject to any disclaimer, the term of this patent is extended or adjusted under 35 U.S.C. 154(b) by 377 days.

(21) Appl. No.: 14/134,667

(22) Filed: Dec. 19, 2013

(65) Prior Publication Data
US 2015/0178803 A1    Jun. 25, 2015

(51) Int. Cl.
| | |
|---|---|
| *G06Q 30/06* | (2012.01) |
| *G06Q 20/10* | (2012.01) |
| *G06Q 20/18* | (2012.01) |
| *G06Q 30/02* | (2012.01) |
| *G07F 19/00* | (2006.01) |

(52) U.S. Cl.
CPC ..... *G06Q 30/0613* (2013.01); *G06Q 20/1085* (2013.01); *G06Q 20/18* (2013.01); *G06Q 30/0281* (2013.01); *G07F 19/211* (2013.01)

(58) Field of Classification Search
CPC ............................... G06Q 30/06; G06Q 30/08
USPC ............................................... 705/26.1–27.2
See application file for complete search history.

(56) References Cited

U.S. PATENT DOCUMENTS

| | | | |
|---|---|---|---|
| 6,732,359 B1 * | 5/2004 | Kirkpatrick et al. ......... | 718/102 |
| 6,934,916 B1 * | 8/2005 | Webb et al. ................. | 715/772 |
| 7,681,229 B1 * | 3/2010 | Ebrahimi ............ | H04L 63/0281 709/229 |
| 2009/0158205 A1 * | 6/2009 | Hampton et al. ............. | 715/790 |
| 2010/0192097 A1 * | 7/2010 | Brugler et al. ............... | 715/821 |
| 2010/0281155 A1 * | 11/2010 | Cipollone ........... | G06F 11/3013 709/224 |
| 2011/0038542 A1 * | 2/2011 | Barkan ............... | G06F 11/3414 382/182 |
| 2013/0046815 A1 * | 2/2013 | Thomas et al. ............... | 709/203 |

OTHER PUBLICATIONS

What is port, Definition from Whatis.com. http://searchnetworking.techtarget.com/definition/port.*
What is application program interface (API)?—Definition from WhatIs.com, http://searchmicroservices.techtarget.com/definition/application-program-interface-API.*
The Java Communications API: A Working Example—By Rick Proctor, http://edn.embarcadero.com/article/31915.*

* cited by examiner

*Primary Examiner* — Ming Shui
(74) *Attorney, Agent, or Firm* — Schwegman, Lundberg & Woessner (57) ABSTRACT

Methods and a system for consumer progress monitoring are provided. A third-party consumer application executing on a Self-Service Terminal (SST) is monitored, without modifying the third-party consumer application, for progress updates. The progress updates are sent to a server and pushed to a device of clerk for monitoring a communication session between a consumer operating the SST and a host system.

20 Claims, 4 Drawing Sheets

CONSUMER PROGRESS MONITORING

BACKGROUND

Self-Service transactions are being utilized more and more by consumers, partly because consumers are more comfortable with the technology and partly because enterprises are increasingly moving to automated solutions to reduce costs and optimize enterprise operational performance. However, as enterprises transition consumers to self-service transactions, the enterprises have to remain sensitive to those consumers that struggle with the technology, and the enterprises have to remain sensitive to the fact that if poor onsite assistance exists, then the consumers may take their business elsewhere out of frustration.

It would be helpful if consumers conduct self-service transactions at Automated-Teller Machines (ATM) within a bank branch and could obtain meaningful and informed assistance with their transaction. However, some bank branches operate a multi-vendor infrastructure in which different vendors provided ATM applications, so that two ATMs within the bank branch may not execute the same ATM application. This means, in practice, that no single vendor can modify the ATM applications because that vendor (the first vendor) will not have to access to, or be licensed to modify, the source code of other vendor's (the second vendor's) ATM application. Furthermore, the first vendor may not be able or willing, to implement: quality assurance testing, integration testing, and security testing to the same level that the second vendor performed.

SUMMARY

In various embodiments, methods and a system for consumer progress monitoring assistance are presented.

According to an embodiment, a method for consumer progress monitoring is provided. Specifically, in an embodiment, a progress of a consumer engaged in a communication session with a host system is monitored at a Self-Service Terminal (SST). The consumer is interacting with a third-party consumer application and the third-party consumer application is unmodified to achieve the monitoring. Next, the progress is posted to a server, which is accessible to a device of a clerk, during the communication session.

DETAILED DESCRIPTION

Figure 1:
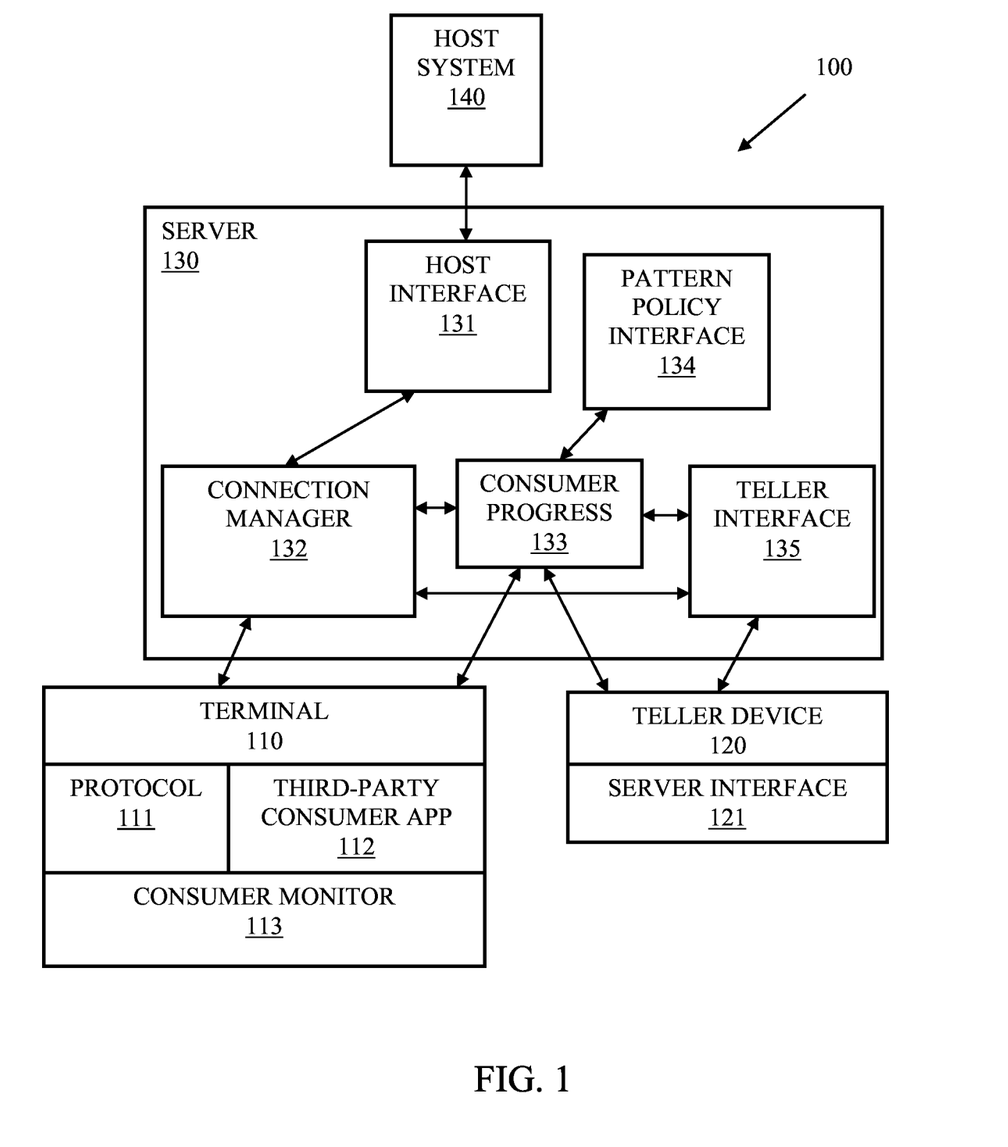
FIG. 1 is a diagram of an example architecture for consumer progress monitoring, according to an example embodiment.

FIG. 1 is a diagram of an example architecture 100 for consumer progress monitoring, according to an example embodiment. The various components are illustrated and the arrangement of the components is presented for purposes of illustration only. It is to be noted that other arrangements with more or less components are possible without departing from the consumer progress monitoring teachings presented herein and below.

The techniques and methods presented herein and below for consumer progress monitoring can be implemented in whole or in part in one, all, or some combination of the components shown with the architecture 100. The techniques and methods are programmed as executable instructions in memory and/or non-transitory computer-readable storage media and processed on one or more processors associated with the various components.

The example architecture 100 includes a terminal 110, a teller device 120, a server 130, and a host system 140. The server 130 also includes a host interface software module 131, a connection manager software module 132, a consumer progress software module 133, a pattern policy manager software module 134, and, optionally, a teller interface software module 135. The terminal 110 includes a protocol software module 111, a third-party consumer application (app) software module 112, and a consumer monitor software module 113. Finally, the teller device 120 includes, optionally, a server interface software module 121.

The various components of the architecture 100 are now discussed within the context of an operation scenario for an automated bank branch where a consumer (can also be referred to herein as a "customer") enters the bank branch to conduct some financial transaction (which can be just a balance inquiry or request for information). The bank branch also has onsite at least one teller or clerk available to assist the consumer if needed.

It is noted that conventionally, where the terminal is an ATM, the ATM directly connects to a host system 140 without any intervening server 130. The advantageous benefits of introducing a server 130 (as reflected in the FIG. 1) between an ATM and a host system will be presented in detail herein and below. Moreover, conventionally, a consumer would approach an ATM supply a bank card, enter a Personal Identification Number (PIN) and select a transaction. After these details are entered, the ATM encrypts the PIN (using an encrypting PINpad) in a manner that can only be decrypted by the host system 140 and uses a Secure Socket Layer (SSL) connection (or other secure connection) to the host system 140 to encrypt the bank card details and the selected transaction. The host system 140 relies on the SSL when authorization codes or instructions are sent directly back to the ATM 110. This conventional approach has been modified for the novel teachings presented herein and below.

The consumer enters the automated bank branch and begins to interact with the terminal 110. The terminal 110 in the present example is an Automated Teller Machine (ATM—a device capable of dispensing (and some ATMs, accepting) currency). It is to be noted that in other embodiments presented herein and below the terminal 110 can be any Self-Service Terminal (SST) device, such as but not limited to a kiosk or a mobile device owned by the consumer (such as a mobile phone, a laptop, a wearable device with processing capabilities and the like). For purposes of the illustration of the FIG. 1, the terminal 110 is an ATM enhanced with new and novel features as discussed below. This embodiment is particularly advantageous when used with public access terminals (such as ATMs or public kiosks) because it facilitates provision of assistance by authorized staff at the public access terminal).

The ATM 110 includes conventional software modules to permit a financial transaction with the host system 140. However, two of those software modules are enhanced with the teachings presented herein, the protocol software module 111 and the consumer monitor software module 113. The ATM 110 also includes a third-party or existing consumer app software module 112. With the teachings herein, the third-party consumer app software module 112 is not modified and remains unchanged for the embodiments presented. The third-party consumer app software module 112 provides the consumer interface for transaction on the ATM 110 with the host system 140.

The customer enters his/her bank card, PIN, and selects a financial transaction at the ATM 110 (using the third-party consumer app software module 112). The PIN is encrypted (by an encrypting PINpad (not shown in the FIG. 1) as is typically the case for conventional ATMs) and the bank card details (typically the account number and an indication of the customer's bank) along with the selected financial transaction are encrypted when the ATM 110 uses the protocol software module 111 to establish an SSL communication session with the server 130. The protocol software module 111 is enhanced to establish the SSL communication session with the server 130, which conventionally would not occur because the SSL communication session would conventionally be directly connected to the host system 140.

The server 130 functions as a forward proxy for the ATM 110 and the protocol software module 111 ensures that the connection between the ATM 110 occurs with the server 130, where connection manager software module 132 via the host interface 131 establishes another SSL connection with the host system 140 to appear to the host system 140 as if it were the ATM 110. The consumer monitor software module 113 is enhanced to allow bi-directional communication between the existing ATM 110 and the teller device 120 via the server 130 through the consumer progress software module 133 (as discussed in greater detail below) using the SSL session between the server 130 and the ATM 110.

Once the communication session, via SSL, is established between the ATM 110 and the server 130 via the enhanced protocol software module 111, the connection manager software module 132 has an encrypted PIN, which it cannot decrypt, and the bank card details with the selected customer bank transaction (which can be decrypted by the connection manager module 132 since it is in the same SSL communication session with the ATM 110).

Next, the connection manager software 132 forwards the encrypted PIN and the bank card details along with the selected bank transaction to the host interface 131. The host interface 131 acts as a transparent proxy to the host system 140, such that from the perspective of the host system 140 the requested SSL connection and the data (encrypted PIN, bank card details, and selected bank transaction) appear to be coming directly from the ATM 110 via a typical connection mode expected by the host system 140. (As noted before, the host system 140 may, when needed, act as a switch if a different host system is required to process the selected financial transaction—such as when the customer's financial account is held by a different financial institution from the automated bank branch.) So, the connection manager software module 132, establishes a communication session between the ATM 110 and the host system 140 via the host interface system 131, with the server 130 acting as a forward proxy to the ATM 110 and at the same time a transparent proxy to the host system 140.

As stated above, the connection manager software module 132 performs authorization and establishes SSL communication sessions with the server 130 to the ATM 110. This was described above. But, the connection manager 132 also establishes SSL communication sessions between the server 130 and the teller device 120. The SSL communication session between the server 130 and the teller device 120 can occur in two manners: between the connection manager software module 132 and the server interface software module 121 of the teller device 120, or between the connection manager module 132 and the teller interface software module 135 of the server 130.

Once, the connection manager module 132 establishes the SSL communication session with the ATM 110, the consumer monitor software module 113 is capable of communicating with the consumer progress software module 133 of the server 130. The consumer monitor software module 113 can listen to a communication port associated with the third-party consumer app software module 112 to detect data coming to or leaving from the third-party consumer app software module 112. The consumer monitor software module 113 is hooked into the third-party consumer app software module 112 to detect and capture messages and data being passed. The consumer monitor software module 113 can also scrape or parse screen fields and data entered by the consumer via the third-party consumer app software module 112. Specifically, the consumer monitor software module 113 is configured to look for patterns in the screens produced and used by the third-party consumer app software module 112. The pattern definitions can be pushed dynamically from the consumer progress software module 133 (received from a pattern policy manager software module 134).

The pattern definitions can be static, such as a text strings "withdrawal," "account balance," "deposit," and others. Moreover, the pattern definitions can be variable, such as "D[1-4].D[2]," where D is any digit 0-9 and the variable expression indicates 1 to 4 digits followed by a period "." followed by 1 to 2 digits. The pattern definition may also define a pattern for an image, such as by describing features of an image that may represent a check. It is noted that the pattern definitions can be more complex and the preceding was presented for purposes of illustration only as other situations can exist for the pattern definitions.

The consumer monitor software module 113 accesses the pattern definitions as files (stored in pattern policy software module 134) that it interprets when monitoring the third-party consumer app software module 112. So, dynamic changes to the pattern definitions can be made by the pattern policy manager software module 134 during an existing communication session between a consumer and the host system 140.

The pattern definitions can also include a specific progress message that the consumer monitor software module 113 is to post (send) to the server 130, via the SSL communication session. The specific message is sent to the consumer progress software module 133. So, a target pattern for a matched pattern may have a different progress message that is to be posted. For example, a pattern may include text that indicates that an amount field has to be entered in a withdrawal transaction screen; this may be communicated as a progress message stating that the customer is performing a cash withdrawal transaction and is at the same stage of entering a transaction amount. This can be done for a variety of reasons, such as to limit the data transmitted or provide more meaningful messages to the teller, who ultimately receives the progress messages from the consumer progress software module 133 via the server interface software module 131 or the teller interface software module 135.

The consumer monitor software module 113 uses the pattern definitions to scan data being presented by the third-party consumer app software module 112 and data entered by the consumer at the ATM 110 into screens presented on a display of the ATM 110 by the third-party consumer app software module 112. When a pattern is detected (the displayed or entered data matches a pattern definition), the consumer monitor software module 113 sends the progress message associated with the pattern definition to the consumer progress software module 133 on the server.

The consumer monitor software module 113 can also be configured to superimpose a screen on top of one or more screens being presented by the third-party consumer app software module 112 on a display of the ATM 110. In an embodiment, the superimposed screen includes a button asking the consumer if the consumer desires assistance from a teller. In an embodiment, the screen includes an informational message designed to assist the consumer with what the consumer is attempting to do during the communication session with the host system 140. In still another case, the screen includes a message that was sent from the teller via the server interface software module 121 or the teller interface software module 135 to the consumer progress software module 133 and pushed as an instruction to the consumer monitor software module 113 on the ATM 110.

Dynamically evaluated policies having conditions can be evaluated in real time by the consumer monitor software module 113 to determine conditionally when and where to superimpose a screen with or without a button for assistance. So, based on one or more patterns detected, the consumer monitor software module 113 can determine to superimpose the request for assistance button screen.

The communication of the progress updates, messages, and instructions passed between the consumer monitor software module 1113 and the teller can be achieved via two mechanisms, both of which traverse through the consumer progress software module 133. Some embodiments may use one of these mechanisms; other embodiments may use the other mechanism. If the first mechanism is used, the data (progress messages, informational messages, and/or instructions) are sent from the consumer progress module 133 to the teller interface software module 135. It should be appreciated that the data transmitted by the consumer progress software module 133 to the teller is "teller viewable data" capable of being viewed within a screen on a display of the teller device 120. It is also noted that at no point is the consumer PIN relayed as a progress message or as any other data from the consumer monitor software module 113.

In an embodiment, the teller interface software module 135 is implemented as a set of browser pages and/or applications that are accessible via a browser. A teller operating the teller device 120 accesses a browser site (hosted by the server 130) via a link to access the teller interface software module 135. At this point, the teller can view the teller viewable data (which does not include the PIN, as discussed above). The SSL communication session between the ATM 100 and the server 130 is separate from the SSL communication session between the server 130 and the host system 140. However, the server acting as a forward proxy to the ATM 110 and separately as a transparent proxy to the host system 140 manages the two SSL communication sessions as one logical communication session from the perspective of the host system 140 and the ATM 110. This avoids having to make any software or hardware changes to the host system 140.

If the second mechanism is used, the teller viewable data are sent from the consumer progress software module 133 directly to the teller device 120, which executes the server interface software module 121, as a mobile application. Regardless of whether the first or second mechanism is used, the teller can now view the teller viewable data on a display of the teller device 120.

Both the teller interface software module 135 and the server interface software module 121 provide for authentication of a teller and/or the teller device 120 to the server 130 via a separate SSL communication session simultaneously managed by the server 130. This communication session was discussed above and established by the connection manager software module 132 interacting with either the teller interface software module 135 or the server interface software module 121 of the teller device 120.

The connection manager software module 132 also receives authorization responses from the host interface 131 originating from the host system 140 and can communicate those authorization responses back to the ATM 110 and the consumer progress software module 133 (which then communications the authorization responses to the teller device 120 via teller interface software module 135 or server interface software module 121). In some cases, as discussed below, the connection manager software module 132 may directly communication with the teller device 120 (through the server interface software module 121 or the teller interface software module 135) when a teller is providing an override for a given customer transaction using the teller device 120.

In some embodiments, the connection manager software module 132 and the consumer progress software module 133 can be implemented as one software module.

The progress messages can be viewed and analyzed by the teller using the teller device 120 via the teller interface software module 135 and/or the server interface software module 121 in real time or near-real time as the customer is in a communication session with the host system 140.

Similarly, responses sent from the host system 140, in response to details sent from the ATM 110 in response to customer input during the SSL communication session (with the server 130 acting as a proxy for both during that communication session), can be passed from the host interface 131 to the connection manager software module 132. The connection manager software module 132 then forwards the responses to the ATM 110 for the ATM 110 to act on and, simultaneously, the connection manager software module 132 sends the responses to the consumer progress software module 133, which then forwards those responses to the teller interface software module 135 and/or the server interface software module 121.

So, both the progress messages of the consumer at the ATM 110 during the communication session with the host system 140 and responses sent back from the host system 140 can be viewed in real or near-real time by the teller operating the teller device 120.

The server 130 can be remotely located offsite from the automated bank branch (which has onsite the terminal 110 and the teller device 120). Alternatively, the server 130 can be located onsite at the bank branch with the terminal 110 and the teller device 120. The host system 140 is remotely located from the automated bank branch and as stated, in some cases, is typically remotely located from the server 130 as well.

The teller device 120 can be a mobile device operated by the clerk (such as a phone, a tablet, a laptop, a tablet device, a wearable processing device, and the like). In another embodiment, the teller device 120 is a standalone terminal within the automated bank branch, although this does not have the advantage of allowing the teller to carry the teller device 120 with him/her as he/she approaches the ATM 110 to assist the customer.

According to various embodiments, the progress of the consumer (which are communicated and pushed via the software module 133) are portrayed or presented within a Graphical User Interface (GUI) operational on the teller device 120. In an embodiment, the progress messages can also include other information that the consumer monitor software interface module 112 is configured to pattern match and push back to the software module 133, such as a consumer request for assistance, or even a key (physical or logical) on the ATM 110 that the customer presses, or a current state of the ATM 110.

It is also to be noted that the progress messages, which are relayed to the teller, can be relayed within the automated bank branch to multiple teller devices 120 that service multiple onsite tellers. This would allow any of the tellers to accept a request for help from the customer (which acceptance would be relayed to the other teller devices 120 via the server interface software module 121 so that the other tellers would know that the customer's request will be dealt with by a teller).

Authorizations (a type of progress message) initiated by the host system 140 can be useful to the tellers for a variety of reasons. For example, suppose the consumer is attempting to withdraw an amount of currency from the ATM 110 that exceeds the consumer's daily allowance at an ATM; but, which would not exceed allowances if the consumer were in front of a teller (that is, at a traditional teller station) making the currency request. Policy may permit the teller to intervene and approach the consumer to validate the identity of the consumer and to provide an override code or operation to the host system 140 that then permits the currency request to be satisfied from the ATM. This can be achieved in multiple manners as well.

For example, the teller can use the interface software modules 135 and/or 121 to establish a connection to the host system 140 (similar to what was described for the communication session between the ATM 110 and the host system 140) and identify the transaction and provide an override. Alternatively, a separate interface (not depicted in the FIG. 1) that a teller might typically use on the teller device 120 may be used to connect with the host system 140 and provide an override by identifying a transaction identification included with the initial transaction as part of a progress message forwarded during the communication session between the ATM 110 and the host system 140. In still another case, the consumer monitor software module 112 may permit the teller to walk over to the ATM 110 and activate some options to provide an override that is relayed to the host system 140 and permits the withdrawal. In yet another situation, the ATM 110 may have an administrative interface on the ATM 110 (not shown in the FIG. 1) that permits the override to be communicated to the host system 140. In yet another situation, the need for an override can be identified in an authorization code sent from the host 140 that is relayed from software module 132 to 133 and from 133 to the teller device 120 via 135 or 121; the teller uses 121 or 135 to send the override to 132 and 132 provides the override code to the ATM 110.

It is noted that this is but one example and a plethora of other scenarios can be used with the teachings presented herein for consumer progress monitoring. In the present example, however, it is apparent that the techniques and architecture 100 permit tellers that monitor consumers progress (operating ATMs 110 to transact with a host financial system 140) to intervene by monitoring transactions and providing responsive assistance to the consumers. It should be appreciated that this has the advantage of enabling the ATM 110 to execute transactions that only a teller station would have been able to execute. As a result, one reason for not using an ATM (because only a teller station can execute the desired transaction) has been removed by this embodiment, thereby facilitating migration of bank customers from teller stations to ATMs.

It is also noted that the consumer can use the ATM 110 at any time to make a request for assistance of the teller. In such a scenario, the teller is aware of what was going on with the consumer at the terminal before coming to assist (because the teller viewable data is presented to the teller, which includes progress messages that detail what the consumer is attempting to execute), which is also more efficient than what has been done heretofore. In still other cases, the teller via the teller device 120 may explicitly offer assistance to the consumer, in such a case a popup window may be activated at the ATM 110 (by the superimposed screen(s) on screens of the third-party consumer app software module 112 instituted by the consumer monitor software module 113) asking the consumer if assistance of a teller is needed. All of this is achieved via the consumer monitor software module 113, the interface modules 135 and/or 121, and software modules 132 and/or 133 as described in detail above.

Figure 2:
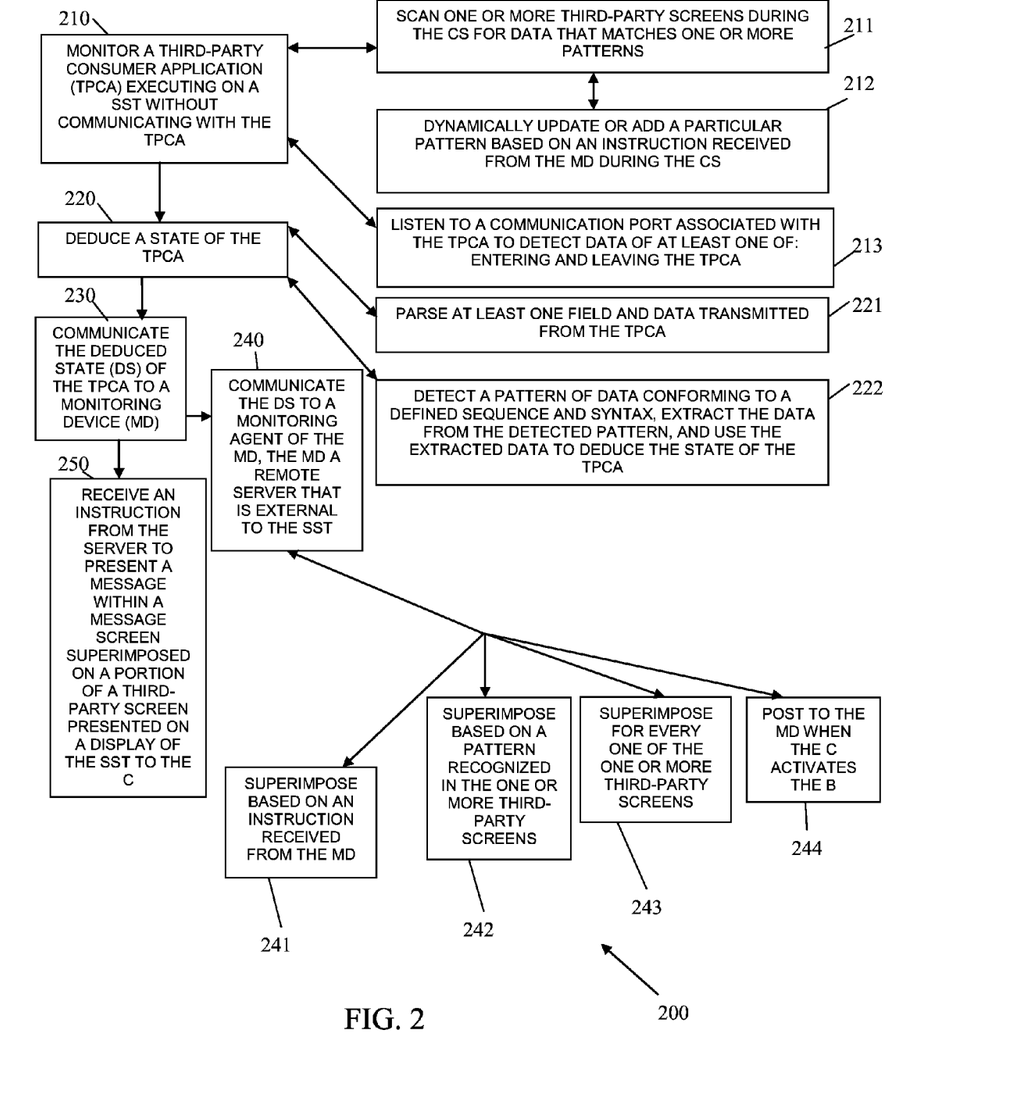
FIG. 2 is a diagram of a method for consumer progress monitoring, according to an example embodiment.

FIG. 2 is a diagram of a method 200 for consumer progress monitoring, according to an example embodiment. The software module(s) that implements the method 200 is referred to as a "consumer monitor agent." The consumer monitor agent is implemented as executable instructions programmed and residing within memory and/or a non-transitory computer-readable (processor-readable) storage medium and executed by one or more processors of a device. The processors of the device that executes the consumer monitor agent are specifically configured and programmed to process the consumer monitor agent. The consumer monitor agent has access to one or more networks during its processing. The networks can be wired, wireless, or a combination of wired and wireless.

In an embodiment, the device that consumer monitor agent is a Self-Service Terminal (SST) operated by a consumer, such as ATM 120 presented above with respect to architecture 100 of the FIG. 1. In another embodiment, the device that processes the consumer monitor agent is a mobile device of the consumer (such as phone, tablet, laptop, wearable processing device, and the like). The consumer monitor agent, in the aforementioned embodiments, can be identified as the consumer monitor software module 113 in the FIG. 1.

At 210, the consumer monitor agent monitors a third-party consumer application that executes on the SST (which is executing the consumer monitor agent). This is done without the consumer monitor agent communicating with the third-party consumer application. That is, the third-party consumer application is unmodified for the teachings presented herein. The consumer uses the third-party consumer application to engage in a communication session with a host system (e.g., bank, etc.).

In an embodiment, the communication session is occurring on an ATM with a host financial system. In another embodiment, the communication session is occurring on any enterprise kiosk with a backend enterprise system, such as an entertainment venue, government venue, retail venue, and others.

The progress is data defined by pattern definitions that are matched in the communication session. In an embodiment, the actual progress messages are messages mapped to matched pattern definitions. So, the progress may not be the data monitored but predefined data messages that map to the data monitored. This was described above with reference to the FIG. 1.

According to an embodiment, at 211, the consumer monitor agent scans one or more third-party screens produced by the third-party consumer application for data that matches one or more patterns defined by pattern definitions. The consumer monitor agent cans the screens during the communication session.

Continuing with the embodiment at 211 and, in another extension thereof, at 212, the consumer monitor agent dynamically updates or adds a particular pattern based on an instruction received from the monitoring device during the communication session. That is, an existing pattern definition for an existing pattern can be updated dynamically or a new pattern definition for a new pattern can be dynamically installed. This was described above with reference to software module 134 of the FIG. 1.

In an embodiment, at 213, the consumer monitor agent listens to a communication port associated with the third-party consumer application to detect data entering and/or leaving the third-party consumer application. The consumer monitor agent establishes a hook into the third-party consumer application's communications (in and out).

At 220, the consumer monitor agent deduces a state of the third-party consumer application. The state reflects a screen being presented on a display of the SST, which was produced by the third-party consumer application, and the state includes content (text (fields) and/or images (graphics) that the third-party consumer application presents within the screen. Moreover, the state includes data entered by the consumer into fields of the screen using the third-party consumer application's interface(s). Deduction of the state can be achieved in a variety of manners.

According to an embodiment, at 221, the consumer monitor agent parses field(s) and data that is to be transmitted or that is being transmitted from the third-party consumer application. Here, presented data that is being presented within a screen of the SST's display can be captured even before the presented data is transmitted by the third-party consumer application to its target (the host system). Similarly, consumer inputted data (which the consumer inputs into fields of the screen) can be captured even before the consumer inputted data is transmitted by the third-party consumer application to the host system. It is noted that the presented data and the consumer inputted data can also be captured as or when the third-party consumer application transmits that data to the host system.

On one case, at 222, the consumer monitor agent detects one or more patterns of data that conforms to a defined sequence and syntax (predefined pattern(s)). Next, the data associated with the detected pattern(s) are extracted from the screen to which it relates (the screen produced by the third-party consumer application), and the consumer monitor agent uses the extracted data to deduce the state of the third-party consumer application. It is also to be noted that the consumer monitor agent can augment the data extracted with more meaningful data to formulate the state. For example, an extracted character "W" from the screen may be mapped by the consumer monitor agent to the phrase "withdrawal transaction." Of course other more complex replacements may exist as well, such that the presence of some extracted data when noted in the absence of or presence of other extracted data can be replaced with a single phrase. This can be achieved via a grammar that maps the extracted data to formulate the state of the third-party consumer application.

At 230, the consumer monitor agent communicates the deduced state of the third-party consumer application to a monitoring device. In an embodiment, the monitoring device is server 130 of the FIG. 1 that executes the consumer progress software module 133. The deduced state can then be forwarded in near-real time to the teller device 120 as the consumer transacts on the SST 110 with the host system 140.

According to an embodiment, at 231, the consumer monitor agent communicates the deduced state to a monitoring agent (e.g., 133) of a monitoring device (e.g., server 130), which is a remote server that is external to the SST.

According to an embodiment, at 240, the consumer monitor agent superimposes a screen having a request for assistance button on a portion of one or more third-party screens being presented on a display of the SST that executes the consumer monitor agent. This is done without modification to the source code associated with the third-party consumer application. This was described above with reference to the FIG. 1.

In one case associated with 240 at 241, the consumer monitor agent superimposes the screen based on an instruction received from the monitoring device. So, the instruction can be received from the teller viewing the progress as teller viewable data via software modules 121 or 135.

In another situation associated with 240 at 242, the consumer monitor agent superimposes the screen based on a pattern recognized in the one or more third-party screens. Here, policy conditions can indicate if one or more specific patterns are matched from the data in the one or more third-party screens then superimpose the screen. Alternatively, a specific third-party screen can trigger the screen being presented.

In still another case associated with 240 at 243, the consumer monitor agent superimposes the screen for each and every one of the third-party screens. Essentially, the request for assistance button is always presented as a superimposed screen during the communication session for the consumer to activate as needed.

According to an embodiment, at 244, the consumer monitor agent posts to the server when the consumer activates the request for assistance button. This too can be viewed as a form of the progress where the consumer is specifically requesting assistance of a teller.

In an embodiment, at 250, the consumer monitor agent receives an instruction from the server to present a message within a message screen that is superimposed on a portion of a third-party screen presented on a display of the SST to the consumer. The message can originate from the teller. In some cases, the consumer monitor agent can also present a message screen for informational assistance that the consumer monitor agent determines may be needed based on evaluation of policy conditions in combination with matched patterns from the third-party screens.

Figure 3:
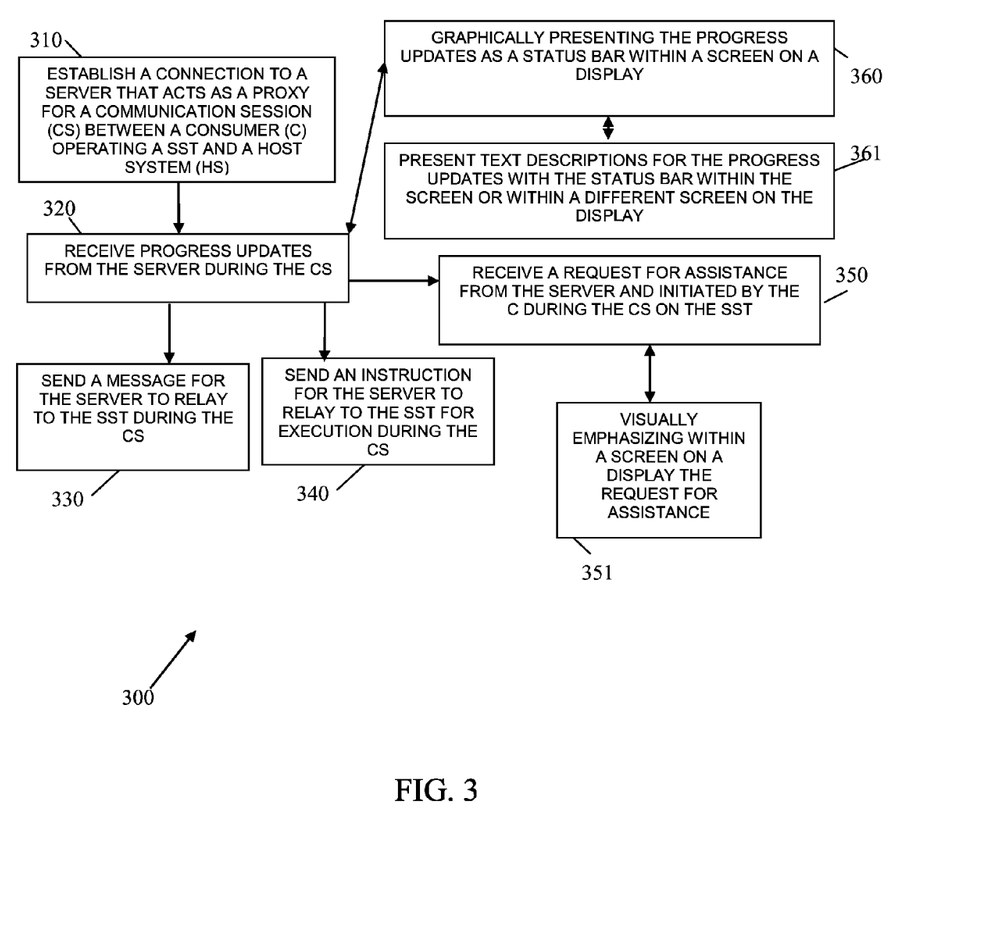
FIG. 3 is a diagram of another method for consumer progress monitoring, according to an example embodiment.

FIG. 3 is a diagram of another method 300 for consumer progress monitoring, according to an example embodiment. The software module(s) that implement the method 300 is referred to herein as a clerk interface monitor agent. The clerk interface monitor agent is implemented as executable instructions and programmed within memory and/or a non-transitory computer-readable (processor-readable) storage medium that executes on one or more processors of a device, such as teller device 130 of the FIG. 1); the processors of the server device are specifically configured to execute the clerk interface monitor agent. The clerk interface monitor agent can access one or more networks; the networks can be wired, wireless, or a combination of wired and wireless.

In an embodiment, the device that processes the clerk interface monitor agent (method process 300) is the teller device 120. In this embodiment, clerk interface monitor agent is implemented as the software module 121 of the FIG. 1.

In another case, the clerk interface monitor agent is identified as the teller interface software module 135. In this embodiment, the clerk interface monitor agent is executed on the server 130 but viewed and interfaced on the device of the clerk (teller device 120); the device can be a mobile device or a standalone terminal or even a monitor connected to the server 130 as a thin client. Again, the teller device 120 can be a tablet in some embodiments.

At 310, the clerk interface monitor agent establishes a connection to a server that acts as a proxy for a communication session between a consumer operating a SST and a host system.

For example, a teller (clerk) uses software modules 121 or 135 of the FIG. 1 to authenticate and login to server 130 via connection manager 132 for purposes of receiving progress updates from software module 132 and for purposes of interacting with the consumer via consumer monitor software module 113.

At 320, the clerk interface monitor agent receives progress updates (progress messages) from the server (such as server 130) during the communication session. This permits real time or near real time monitoring of the progress associated with the consumer's communication session with the host system.

According to an embodiment, at 330, the clerk interface monitor agent sends a message for the server to relay to the SST during the communication. For instance, the teller may decide based on the progress updates that the consumer on the SST should receive some message. This is sent through the software module 132 of the server 130 to the SST 110 using the software module 113.

In another embodiment, at 340, the clerk interface monitor agent sends an instruction for the server to relay to the SST for execution during the communication session. This may be to present a request for assistance button via a superimposed screen or even activate some feature of the third-party consumer application software module on behalf of the consumer.

In one situation, at 350, the clerk interface monitor agent receives a request for assistance from the server. The request for assistance is initiated by the consumer during the communication session on the SST. This was described above with reference to the FIGS. 1 and 2.

Continuing with the embodiment of 350 and in another situation of 350 at 351, the clerk interface monitor agent visually emphasizes the request for assistance within a screen on a display of the device that executes the clerk interface monitor agent. For example, the request for assistance can be highlighted or colored red within the screen.

In an embodiment, at 360, the clerk interface monitor agent graphically presents the progress updates as a status bar within a screen on a display of the device that executes the clerk interface monitor agent. Other graphical symbols can be presented as well.

Continuing with the embodiment at 360 and in a particular instance of 360 at 361, the clerk interface monitor agent presents text descriptions for the progress updates with the status bar within the screen or within a different screen on the display. So, the clerk can receive text information reflecting the progress updates along with graphical presentations.

In an embodiment, the clerk interface monitor agent receives the progress updates as text messages on a mobile device that executes the clerk interface monitor agent.

Figure 4:
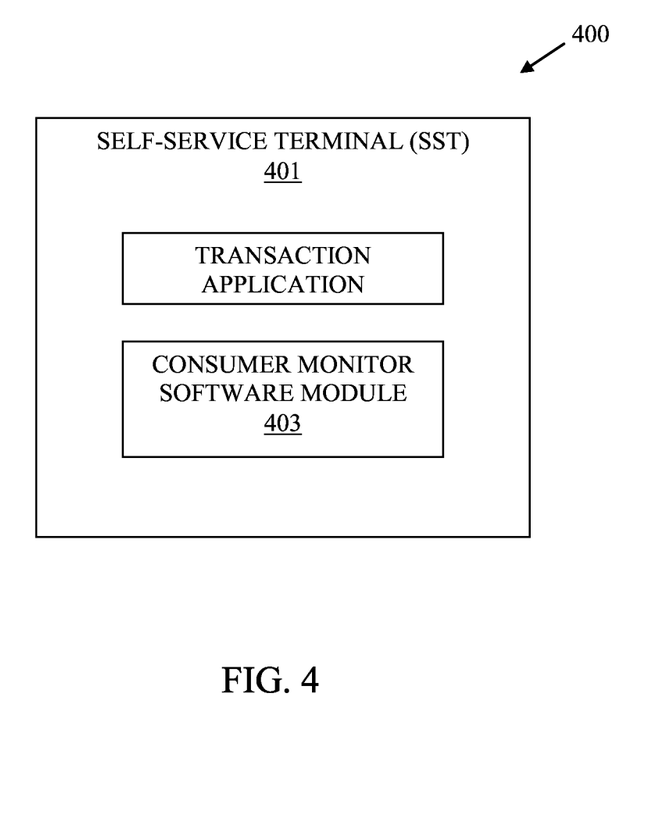
FIG. 4 is a diagram of a SST, according to an example embodiment.

FIG. 4 is a diagram of a SST 400, according to an example embodiment. The components of the SST 400 are programmed and reside within memory and/or a non-transitory computer-readable medium and execute on one or more processors of one or more devices. The SST 400 has access and can communicate over one or more networks; and the networks can be wired, wireless, or a combination of wired and wireless.

In an embodiment, the SST 401 is ATM 110.

In an embodiment, the SST 401 is a retail or government SST providing goods or services to consumers at a variety of venues.

In an embodiment, the SST 401 is a vending machine.

The SST 401 includes a transaction application 402 and a consumer monitor software module 403.

The transaction application 402 executes on one or more processors of the SST 401 as software. The transaction application 402 is a third-party consumer application provided as an interface for a consumer of the SST 401 to conduct transaction with a host system. In an embodiment, the transaction application 402 is the third-party consumer app 112 of the FIG. 1. The transaction application 402 is unmodified (source and processing are not altered) with the teachings provided herein. Example aspects of what the transaction application 402 provides (in terms of functionality and features) were presented above with the descriptions of the FIGS. 1-3.

The consumer monitor software module 403 executes on one or more processors of the SST 401. In an embodiment, the consumer monitor software module 403 is the consumer monitor software module 112 of the FIG. 1. Example aspects and features of the consumer monitor software module 403 were presented above with reference to the FIGS. 1-3.

The consumer monitor software module 403 is operable to: monitor a communication port associated with the transaction application 402; parse identified screen fields to detect: a state of the transaction application 402 and data entered by the consumer relating to that state; and communicate the detected state of the transaction application 402 for use by a monitoring device (e.g., server 130 using software module 133 of the FIG. 1).

According to an embodiment, the consumer monitor software module 403 is further configured to perform the parsing by screen scraping transaction screens provided by the transaction application 402 that are presented on a display of the SST 401.

In an embodiment, the consumer monitor software module 403 is further configured to send a request for assistance to the monitoring device. The request is activated by the consumer by the consumer activating a button presented within a superimposed screen. The consumer monitor software module 403 produces the superimposed screen and overlays that screen onto one or more of the transaction screens presented on the display of the SST 401 by the transaction application 402.

It should be appreciated that where software is described in a particular form (such as a component or module) this is merely to aid understanding and is not intended to limit how software that implements those functions may be architected or structured. For example, modules 133 and 134 are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A method of monitoring progress of a customer at a Self-Service Terminal (SST), the method comprising:
   monitoring, by a monitor agent executing on a processor of the SST, an application executing on the SST, the application processing a transaction on the SST;
   establishing a hook, by the monitor agent, into the application to listen to a communication port through which the application receives and provides communications as the application is executing on the SST;
   deducing, by the monitor agent, a state of the application, wherein deducting further includes detecting, by the monitor agent, patterns in screens that are rendered as output by the application to a display of the SST during execution of the application;
   communicating, by the monitor agent, the deduced state of the application to a monitoring device; and
   provisioning, by the monitor agent, SST assistance based on the monitoring and the deducing, and facilitating processing progress or the transaction being processed on the SST by the application through the assistance.

2. The method of claim 1, wherein monitoring further includes listening to the communication port associated with the application to detect data of at least one of: entering and leaving the application.

3. The method of claim 1, wherein deducing further includes parsing at least one field and data transmitted from the application.

4. The method of claim 1, wherein deducing further includes detecting at least one pattern of data conforming to a defined sequence and syntax, extracting the data from the detected pattern, and using the extracted data to deduce the state of the application.

5. The method of claim 1, wherein communicating further includes communicating to a monitoring agent of the monitoring device, which is a remote server that is external to the SST.

6. The method of claim 1 further comprising, superimposing a screen having a request for assistance button on a portion of one or more existing screens being presented on a display of the SST during the communication session without modifying the application that produces the existing screens.

7. The method of claim 6, wherein superimposing further includes superimposing based on an instruction received from the monitoring device.

8. The method of claim 6, wherein superimposing further includes superimposing based on a pattern recognized in the one or more screens.

9. The method of claim 6, wherein superimposing further includes posting to the monitoring device when the consumer activates the request for assistance button.

10. The method of claim 1 further comprising, receiving an instruction from the monitoring device to present a message within a message screen superimposed on a portion of an existing screen presented on a display of the SST to the consumer.

11. A method, comprising:
    establishing, by clerk interface monitor agent executing on a processor of a hardware device, a connection to a server, wherein establishing further includes providing, by the clerk interface monitor agent, a forward proxy for a Self-Service Terminal (SST) during the connection and providing, by the clerk interface monitor agent, a transparent proxy for a host that has a communication session between a consumer operating the SST and the host system, wherein the hardware device is different from the SST; and
    receiving, by the clerk interface monitor agent, progress updates from the server during the communication session, wherein receiving further includes monitoring, by the clerk interface monitor agent, the communication session as the communication session is processed between the SST and the host system for actions taken by the host system and by the SST through the consumer;
    monitoring, by a monitor agent executing on a processor of the SST, an application executing on the SST, the application processing a transaction on the SST; and
    establishing a hook, by the monitor agent, into the application to listen to a communication port through which the application receives and provides communications as the application executes on the SST, and wherein monitoring further includes tracking application usage of the application and provisioning SST assistance for the transaction based on the monitoring and the progress updates, and facilitating progress of a transaction being processed by the application on the SST through the SST assistance.

12. The method of claim 11 further comprising, sending, by the device, a message for the server to relay to the SST during the communication session.

13. The method of claim 11 further comprising, sending by the device, an instruction for the server to relay to the SST for execution during the communication session.

14. The method of claim 11 further comprising, receiving, by the device, a request for assistance from the server and initiated by the consumer during the communication session on the SST.

15. The method of claim 14, wherein receiving the request for assistance further includes visually emphasizing within a screen on a display of the device the request for assistance.

16. The method of claim 11 further comprising, graphically presenting, by the device, the progress updates as a status bar within a screen on a display of the device.

17. The method of claim 16, wherein presenting further includes presenting text descriptions for the progress updates with the status bar within the screen.

18. A Self-Service Terminal (SST), comprising:

the SST having one or more processors configured with:

a transaction application that executes on the one or more processors, and the transaction application to execute transactions for a consumer of the SST, wherein the transaction application executes on the SST; and a consumer monitor software module that executes on the one or more processors and configured to (i) establish a hook to listen to a communication port associated with the transaction application, the transaction application receives input and provides output through the communication port, (ii) identify screen fields rendered and populated by the transaction application from images of the screen fields produced as output by the transaction application during the transactions on the SST, (iii) parse the identified screen fields to detect (a) a state of the transaction application by identifying patterns in the screen fields, and (b) data entered by the consumer relating to that state, (iv) communicate the detected state of the transaction application to a monitoring device, (v) monitor the detected state and process at least one action in response to the detected state, and (vi) provision SST assistance in response to the detected state to facilitate progress of the transactions with the transaction application on the SST.

19. The SST of claim 18, wherein the consumer monitor software module is configured to perform (iii) by screen scraping transaction screens provided by the transaction application that are presented on a display of the SST.

20. The SST of claim 18, wherein the consumer monitor software module is further configured to send a request for assistance to a server, the request activated by the consumer activating a button presented within a superimposed screen that is produced by the consumer monitor software module and that the consumer monitor software module overlays onto one or more of the transaction screens the SST.

* * * * *